United States Patent
Wakayama et al.

[11] Patent Number: 5,888,430
[45] Date of Patent: Mar. 30, 1999

[54] GRAPHITE COMPOSITE AND METHOD FOR PRODUCING THE SAME

[75] Inventors: Hiroaki Wakayama; Yoshiaki Fukushima; Jirou Mizuno; Uichiro Mizutani; Toshiharu Fukunaga, all of Aichi, Japan

[73] Assignee: Kabushiki Kaisha Toyota Chuo Kenkyusho, Aichi-ken, Japan

[21] Appl. No.: 816,334

[22] Filed: Mar. 13, 1997

[30] Foreign Application Priority Data

Mar. 14, 1996 [JP] Japan .................................. 8-058115

[51] Int. Cl.$^6$ .............................. H01B 1/04; C01B 31/04; H01M 4/60
[52] U.S. Cl. ......................... 252/503; 252/506; 423/448; 429/213; 429/218.1
[58] Field of Search .................................. 252/503, 506; 423/448; 428/305.5; 429/209, 213, 218.1

[56] References Cited

U.S. PATENT DOCUMENTS

| | | | |
|---|---|---|---|
| 4,435,375 | 3/1984 | Tamura et al. | 423/439 |
| 4,799,957 | 1/1989 | Vogel | 75/243 |
| 5,176,969 | 1/1993 | Miyabayashi et al. | 429/212 |
| 5,436,093 | 7/1995 | Huang et al. | 429/217 |
| 5,522,127 | 6/1996 | Ozaki et al. | 29/623.5 |

FOREIGN PATENT DOCUMENTS

| | | |
|---|---|---|
| 62-87407 | 4/1987 | Japan . |
| 4-79153 | 3/1992 | Japan . |
| 4-202006 | 7/1992 | Japan . |
| 6-223821 | 8/1994 | Japan . |

*Primary Examiner*—Mark Kopec
*Attorney, Agent, or Firm*—Oblon, Spivak, McClelland, Maier & Neustadt, P.C.

[57] ABSTRACT

The graphite is a composite between graphite particles and other fine, solid element particles, in which the graphite particles account for at least 40 atomic % and the other element particles have particle sizes of 900 nm or smaller and are dispersed in said graphite particles. The other elements may be Li and Si. Preferably, a part of said other elements forms an intercalation compound with graphite. The composite is suitable for a negative electrode of lithium secondary batteries having large discharging capacity, and as adsorbent materials of adsorbing various substances.

16 Claims, 3 Drawing Sheets

GRAPHITE COMPOSITE AND METHOD FOR PRODUCING THE SAME

CROSS-REFERENCES OF RELATED APPLICATIONS

Japanese Patent Application No. 8-47407 is incorporated herein by reference.

BACKGROUND OF THE INVENTION

1. Field of the Invention

The present invention relates to a graphite composite which is usable, for example, in electrode materials, adsorbent materials, lightweight high-conductive materials, superconductive materials, catalysts for polymerization, and catalysts for ammonia synthesis and diamond synthesis.

2. Description of the Related Art

Graphite composites have been proposed, which comprise graphite and fine particles of an element capable of alloying with Li, said particles being finely dispersed in graphite. Such graphite composites are known to be formed through CVD, in which a substance containing an element capable of alloying with Li, such as $SiCl_4$, is heated to give a gaseous precursor, and this is reacted with graphite at high temperatures of up to about 1000° C. through gaseous reaction to produce a graphite composite.

On the other hand, known are graphite composites comprising graphite particles and particles of a metallic or non-metallic element and containing a complex as formed through intercalation of a metal into layers of graphite crystallites (hereinafter referred to as an intercalation compound). As the means of producing such intercalation compound-containing graphite composites, known are a method for forming intercalation compounds, which comprises heating a metal followed by catalytically reacting the resulting gaseous phase of said metal with graphite (see Japanese Patent Application Laid-Open No. 62-87407), and a method for forming intercalation compounds, which comprises electrochemically intercalating a metal into graphite layers in an electric field (see Japanese Patent Application Laid-Open No. 4-79153). In Japanese Patent Application Laid-Open No. 4-202006, used is a two-bulb method for forming graphite intercalation compounds.

Lithium secondary batteries are known, of which the negative electrode comprises graphite and in which lithium ions reversibly move between the cathode and the negative electrode via an electrolytic solution to produce charging-discharging cycles. As the graphite for such use, employed is powdery graphite to be formed by powdering natural graphite in an mortar into fine particles having a mean particle size of 100 µm or smaller (see Japanese Patent Application Laid-Open No. 6-223821), or synthetic graphite to be synthesized by calcining resins such as synthetic resins having benzene rings, or organic compounds such as cokes and pitch, at temperatures of 1200° C. or lower.

However, the above-mentioned means of powdering natural graphite in a mortar is disadvantageous in that its powdering power is too weak to successfully obtain fine graphite crystallites having particle sizes of not larger than 10 nm. Therefore, if the powdery graphite as produced according to said means is used as the negative electrode material in lithium secondary batteries, the amount of lithium ions to be intercalated into the negative electrode is small and, as a result, the discharging capacity of the batteries is small. On the other hand, fine crystallites of synthetic graphite to be obtained by calcining organic compounds contains large amounts of impurities such as hydrogen and oxygen. Therefore, if such synthetic graphite is used as the negative electrode material in lithium secondary batteries, these impurities disadvantageously react with lithium ions thereby increasing the irreversible capacity of the batteries.

The above-mentioned graphite composite formed through CVD and comprising graphite particles and fine particles of an element capable of alloying with Li is also disadvantageous in that the crystallinity of the graphite particles is poor and some graphite particles may form carbides. Therefore, if the graphite composite of this type is used as the negative electrode material in lithium secondary batteries, such is disadvantageous in that the lithium-discharging capacity of the graphite particles is small at low potential. In addition, the graphite composite formed through CVD contains large amounts of impurities such as hydrogen and oxygen. Therefore, when this is used as the negative electrode material in lithium secondary batteries, the impurities react with lithium thereby increasing the irreversible capacity of the batteries. Moreover, the CVD method itself is expensive, resulting in the increase in the production costs of the graphite composite, and the industrial applicability of the graphite composite is low.

The other graphite composites mentioned hereinabove, which are produced through vapor-phase catalytic reaction of a heated metal vapor with graphite or produced through electrochemical reaction are also disadvantageous in that the intercalation compound and the metal are not satisfactorily finely dispersed in graphite. Therefore, if such graphite composites are used as the negative electrode material in lithium secondary batteries, the metal is dropped off during repeated charging-discharging cycles, resulting in that the graphite composites used could not be active enough as the active material in negative electrodes.

SUMMARY OF THE INVENTION

The present invention has been made in consideration of the above-mentioned current situations, and its object is to provide a graphite composite which can be advantageously used as the electrode material in lithium secondary batteries.

We, the present inventors have discovered that, when a powdery mixture comprising graphite particles and other crystalline particles is mechanically ground under predetermined grinding conditions, then graphite particles with good crystallinity are formed to give a graphite composite comprising said other crystalline particles as finely dispersed therein. On the basis of this discovery, we have completed the present invention.

Specifically, the first aspect of the present invention is to provide a graphite composite comprising: graphite particles contained in at least 40 atomic % in said composite; and fine particles of an element except carbon having particle sizes of 900 nm or smaller and being dispersed in said graphite particles, said graphite particles and said fine particles being ground and mixed at a grinding acceleration of at least 2 G or larger.

In one preferred embodiment of the first aspect of the invention, the element of said fine particles is at least one of Li, Al, Sn, Pb, Cd, Ag, Au, Ba, Be, Bi, Ca, Cr, Cu, K, Mn, Mo, Nb, Ni, Na, Pd, Ru, Te, Ti, Pt, Pu, Rb, Zr, Zn, Se, Sr, Sb, Si, Tl, V, Ge and S.

In further preferred embodiments of the first aspect of the invention, said fine particles are of silicon crystallites or of lithium particles; and at least a part of said fine particles forms an intercalation compound with said graphite particles. More preferably, said fine particles are of lithium particles.

In yet further preferred embodiments of the first aspect of the invention, the graphite particles have a specific surface area of 100 m²/g or larger; the hydrogen content of the graphite particles is 0.05 or smaller in atomic ratio, H/C, which is the dividend of the number of hydrogen atoms by the number of carbon atoms constituting the graphite particles; and the graphite particles are heat-treated in a steam atmosphere at from 600° to 900° C.

The second aspect of the present invention is the graphite composite of the first aspect of the invention used for the electrode material in lithium secondary batteries.

It is preferred that the graphite composite is incorporated with a negative electrode material for conventional lithium secondary batteries.

Where the graphite composite of the invention is used as the negative electrode material in lithium secondary batteries, a large amount of lithium ions are easily intercalated into the layers of the graphite particles because those of the present invention have good crystallinity. In addition, since the graphite particles of the present invention contain only small amounts of impurities such as hydrogen and oxygen, the amounts of the hydroxyl groups and carboxyl groups at the ends of the graphite molecules are small, resulting in that the graphite molecules are less active with lithium ions. Moreover, the graphite composite has high electroconductivity brought by the fine metallic particles finely dispersed therein.

Further, since Li or Si may be finely dispersed in the graphite composite of the present invention as fine particles, the graphite composite is advantageously used as the negative electrode material in lithium secondary batteries in which the fine particles alloy with a large amount of Li to charge or discharge a large amount of lithium ions and increase the charging/discharging capacity of lithium secondary batteries comprising the graphite composite of the present invention. In addition, the alloying of the fine particles with Li brings about little change in the volume of the graphite composite. This enlarges the rooms for planning freely the shape of batteries. Further, since the graphite composite of the invention has spacious structure as shown in FIG. 3 or FIG. 4, the lithium secondary batteries comprising the graphite composite of the present invention can have good cycle characteristics. Even if some fine particles dispersed in the graphite composite are changed to finer crystallites by repeating charging/discharging cycles, they are still confined in the graphite composite so that the fine particles may still have good electrical connection with the graphite composite and the composite may maintain a good charge/discharge characteristic.

Where the fine particles and the graphite particles form intercalation compounds in the graphite composite of the invention, the graphite composite is more preferably used as the negative electrode material in lithium secondary batteries, since a large amount of lithium ions may be intercalated into the graphite particles and even into the graphite intercalation compounds. Lithium secondary batteries comprising the graphite composite of that type shall have more enhanced discharging capacity.

Moreover, since the graphite composite of the invention has such good electroconductivity, it can be used as a lightweight high-conductive material. If the type of the metal to be in the graphite composite is varied, depending on its use, the graphite composite may further be used in adsorbent materials, superconductive materials, reagents for polymerization, and catalysts for ammonia synthesis and diamond synthesis.

The third aspect of the present invention is to provide a method for producing a graphite composite comprising the steps of: preparing a powdery mixture of at least 40 atomic % of graphite particles with the balance of particles of other elements; and grinding said mixture at a grinding acceleration of at least 2 G or larger, thereby giving a graphite composite comprising said particles of other elements having particle sizes of 900 nm or smaller and being dispersed in said graphite particles.

DESCRIPTION OF PREFERRED EMBODIMENTS OF THE INVENTION

Figure 1:
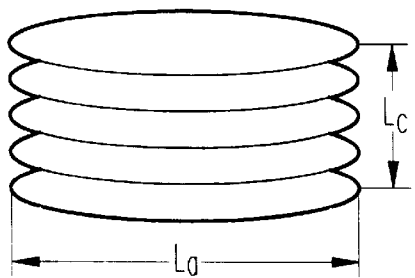
FIG. 1 is a graphical view showing the outline of one graphite particle that constitute the graphite composite of the present invention.
Figure 2:
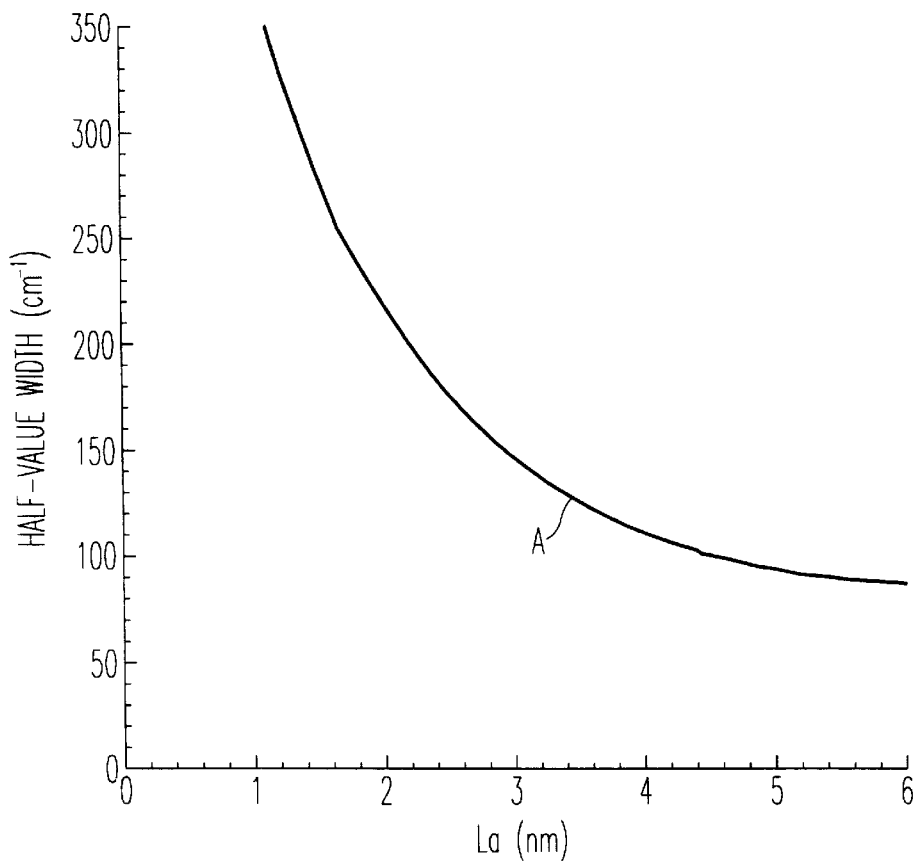
FIG. 2 is a figure showing the relationship between the half-value width of the Raman peak of the graphite particle constituting the graphite composite of the invention and La of said graphite particle.

As in FIG. 1 graphically showing one graphite particle constituting the graphite composite of the present invention, it is desirable that each graphite particle constituting the graphite composite is a crystalline one with good crystallinity in which carbon layers each having almost the same shape and the same surface area are laminated to give a columnar graphite structure. It is further desirable that the fine crystalline graphite particles are such that the half-value width of the Raman peak at a wavenumber of 1350 cm$^{-1}$ as obtained through Raman spectrography of said particles is smaller than the value to be obtained by adding 19.0 to the product of the inverse number of the particle size (nm) of the plane of the graphite structure including the a-axis and b-axis thereof (hereinafter referred to as La) and 376. The smaller half-width value of the Raman peak indicates that each graphite particle constituting the graphite composite has higher crystallinity and that the sizes of the crystalline graphite particles are relatively uniform. The preferred range of the half-value width of the Raman peak of the graphite particle constituting the graphite composite of the present invention appears below the curve A in FIG. 2. In FIG. 2, the vertical axis indicates the half-value width of the Raman peak, and the horizontal axis indicates La.

More preferably, the half-value width of the Raman peak of the graphite crystallites constituting the graphite composite of the present invention is smaller than the value to be obtained by adding 10.5 to the product of the inverse number of La and 341. Further preferably, La is 4.0 nm or smaller, and the product of the inverse number of the crystallite size of the graphite crystallites in the direction of the c-axis thereof, Lc, which is defined by the thickness of the laminated carbon layers constituting the fine crystalline graphite particle structure, and La is 0.15 or larger. The value of La/Lc of being 0.15 or larger concretely means that the fine crystalline graphite particle structure expands.

Where La is 4.0 nm or smaller, the pores existing between the fine crystalline graphite particles in the graphite composite of the invention are increased. Where La/Lc is 0.15 or larger, the surface area of each carbon layer constituting the graphite structure and including the a-axis and b-axis thereof is enlarged.

Also preferably, the fine graphite particles constituting the graphite composite of the invention each have a specific surface area of 100 m²/g or larger. In this preferred embodiment, the pores to be formed on the surfaces of the fine graphite particles are increased, resulting in the increase in the proportion of the pores around them to the volume of the graphite composite.

Further preferably, the hydrogen content of the fine graphite particles constituting the graphite composite of the invention is 0.05 or smaller in terms of the ratio by number, H/C, of hydrogen elements to carbon elements constituting the graphite particles. In this preferred embodiment, the content of the impurities, such as hydrogen and oxygen, to be in the graphite particles is reduced, and therefore hydroxyl groups and carboxyl groups are difficult to form in the graphite particles, resulting in the reduction in such functional groups to be formed at the ends of the graphite particles.

The graphite particles constituting the graphite composite of the invention may be derived from graphite, preferably from natural graphite with high purity or from artificial graphite having a high degree of graphitization, such as highly-oriented pyrolyzed graphite (HOPG) or from artificial graphite having a large amount of the ends of the graphite particles, such as carbon fiber or mesocarbon microbeads.

The elements of the other fine particles constituting the graphite composite of the invention may include Li and metals or non-metals capable of alloying with Li. The metals capable of alloying with Li may include Al, Sn, Pb, Cd, Ag, Au, Ba, Be, Bi, Ca, Cr, Cu, K, Mn, Mo, Nb, Ni, Na, Pd, Ru, Te, Ti, Pt, Pu, Rb, Zr, Zn, Se, Sr, Sb, Tl and V. The non-metals capable of alloying with Li may include Si, Ge and S. The elements of such fine particles may further be metals or non-metals not alloying with Li.

Desirably, the mean particle size of such fine element particles is 900 nm or smaller. In particular, if the mean particle size of the fine element particles capable of alloying with Li is larger than 900 nm, the particles could not finely dispersed in the graphite composite of the invention. If the graphite composite comprising such large element particles is used as the negative electrode material in lithium secondary batteries, the change in its volume occurring during the alloying of the element particles with Li is too large, whereby many such element particles peel or drop off from the surface of the graphite composite or are crystallized to give fine crystals, resulting in that they could no more participate in the charging/discharging reaction in batteries. Further desirably, the element particles are finely dispersed to the order of from mono-atomic molecules to clusters.

The graphite particles constituting the graphite composite of the present invention are those as ground and mixed at a grinding acceleration of 2 G or larger. If the grinding acceleration is smaller than 2 G, such is unfavorable since the graphite particles formed could not be sufficiently dispersed.

Figure 3:
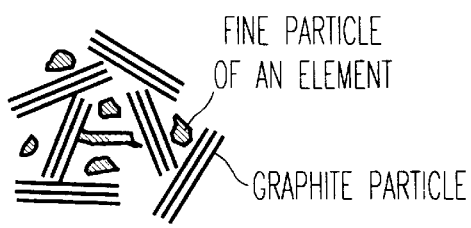
FIG. 3 is a graphical view showing the microstructure of the graphite composite of the invention.

FIG. 3 graphically shows the dispersion of graphite particles and other element particles as finely dispersed to constitute the graphite composite of the present invention.

More preferably, in the graphite composite of the invention, the other fine element particles are intercalated into the layers of each graphite particle. Even more preferably, the proportion of the intercalated fine element particles is 10 atomic % or more relative to all the fine element particles. In this preferred embodiment, the graphite composite comprises such fine graphite intercalation compound particle along with non-intercalated fine graphite particles and other fine element particles in fine dispersion.

Figure 4:
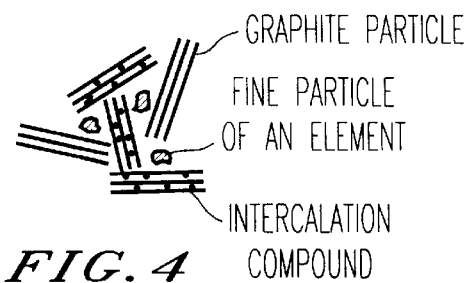
FIG. 4 is a graphical view showing the microstructure of the graphite composite of the invention, which comprises graphite particles partly with intercalation compounds, and other fine element particles.

FIG. 4 graphically shows the dispersion of graphite particles and other element particles in which a part of said graphite particles are in the form of intercalation compounds with other element particles.

The graphite particles constituting the graphite composite of the present invention must account for not smaller than 40 atomic % of all the particles constituting it. If the proportion of the graphite particles is smaller than 40 atomic %, the graphite particles could hardly be dispersed with the other fine element particles. On the other hand, however, the proportion of the graphite particles is preferably not larger than 99 atomic %. This is because, if the proportion of the other fine element particles is smaller than 1 atomic %, such is too small to exhibit the effects of the particles, and if so, there will be little difference between the graphite composite comprising such other element particles and ordinary graphite composed of graphite particles only.

The graphite composite of the present invention may be prepared by mechanically grinding graphite and other solid element powder. To grind these, a grinding device capable of producing a high grinding acceleration of 2 G or larger must be used. As the grinding device, preferred is a ball mill that may produce such a high grinding acceleration. The grinding device capable of attaining a higher grinding acceleration may produce better results. In particular, preferred is a planet ball mill, as producing a high grinding acceleration of 5 G or larger. If oxygen exists in the grinding container, graphite being ground therein will be easily ignited. Therefore, it is desirable to put an inert gas such as argon into the container and to seal the container during grinding the particles. The use of the container in this condition is preferred as being able to reduce the amounts of impurities, such as hydrogen and oxygen, to be introduced into the system being ground. Now, the present invention is described in more detail hereinunder with reference to the following examples.

EXAMPLE 1

A powder mixture was prepared, comprising 4.5 g of a powder of highly-oriented pyrolyzed graphite (HOPG) with a degree of graphitization of 0.92 and 1.1692 g of a silicon powder as obtained by grinding silicon wafers followed by classifying the resulting particles through a 300-mesh sieve. This had a graphite content of 90 atomic %. This was put into a stainless, 80-cc planet ball mill, and air existing in the mill was substituted with argon gas to make the mill have an inert atmosphere, prior to starting the grinding of the mixture in the mill. Under this condition, the mixture was ground at a grinding acceleration of 150 G, at room temperature for 0.5 hours, to give a graphite composite comprising graphite particles and fine silicon particles.

The thus-obtained graphite composite was subjected to X-ray diffractometry, using CuKα as the radiation source.

Figure 5:
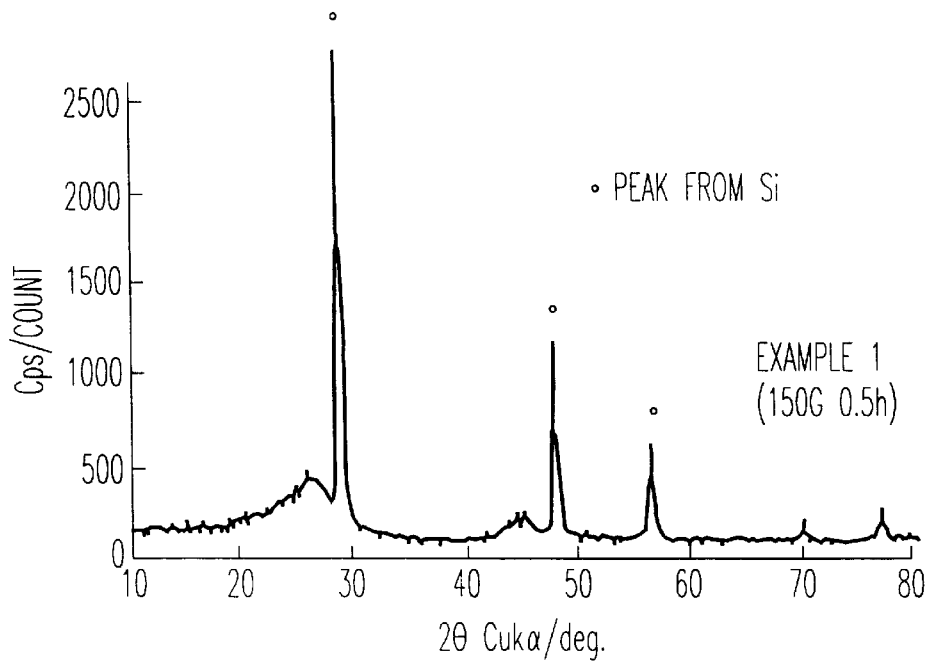
FIG. 5 is an X-ray diffraction pattern of the graphite composite of Example 1, showing the X-ray diffraction peaks thereof.

FIG. 5 shows the X-ray diffraction profile obtained herein. The diffraction peaks seen in FIG. 5 resulted from the fine silicon crystallites existing in the graphite composite, which verify the absence of any side products such as silicon carbide. From these diffraction peaks, obtained was the particle size of the fine silicon crystallites in accordance with the Scherrer's equation mentioned below. In this equation, L indicates the particle size, θ indicates the diffraction angle, β indicates the half-value width, and λ indicates the wavelength of the X-ray applied.

$$L=0.9(\lambda/\beta)\cos^{-1}\theta$$

As a result, the particle size of the fine silicon crystallites existing in the graphite composite was 350 nm. This indicates that fine silicon particles having particle sizes of not larger than 900 nm were formed in the graphite composite obtained herein.

EXAMPLE 2

The same powdery mixture was ground in the same manner as in Example 1, except that the grinding acceleration was 100 G and that the grinding time was 1 hour, to obtain a graphite composite comprising graphite particles and fine silicon crystallites.

Figure 6:
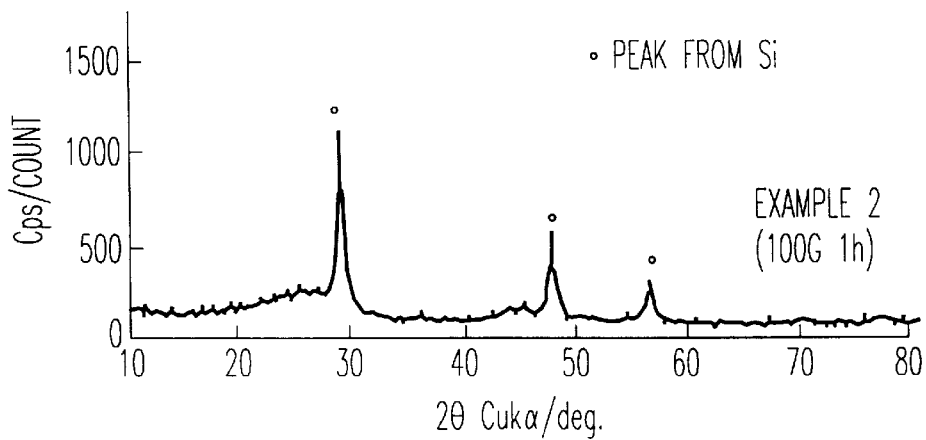
FIG. 6 is an X-ray diffraction pattern of the graphite composite of Example 2, showing the X-ray diffraction peaks thereof.

The graphite composite obtained herein was subjected to X-ray diffractometry in the same manner as in Example 1, and obtained was the resulting X-ray diffraction profile as in FIG. 6. Like in Example 1, the profile in FIG. 6 gave diffraction peaks resulting from the fine silicon crystallites existing in the graphite composite. From these diffraction peaks, obtained was the particle size of the fine silicon crystallites existing in the graphite composite, according to the above-mentioned Scherrer's equation.

As a result, the particle size of the fine silicon crystallites existing in the graphite composite was 95nm. This indicates that fine silicon particles having particle sizes of not larger than 900 nm were formed in the graphite composite obtained herein.

EXAMPLE 3

A powdery mixture was prepared, comprising 4.504 g of a powder of natural graphite (produced in Santo-sho, China) with a degree of graphitization of 0.93 and 0.868 g of a powder of lithium metal. This had a graphite content of 75 atomic %. This was ground under the same condition as in Example 1, except that the grinding acceleration was 10 G and that the grinding time was 12 hours, to obtain a graphite composite comprising graphite particles and fine lithium particles in which a part of the fine lithium particles were intercalated into the graphite particles to form intercalation compound particles.

Figure 7:
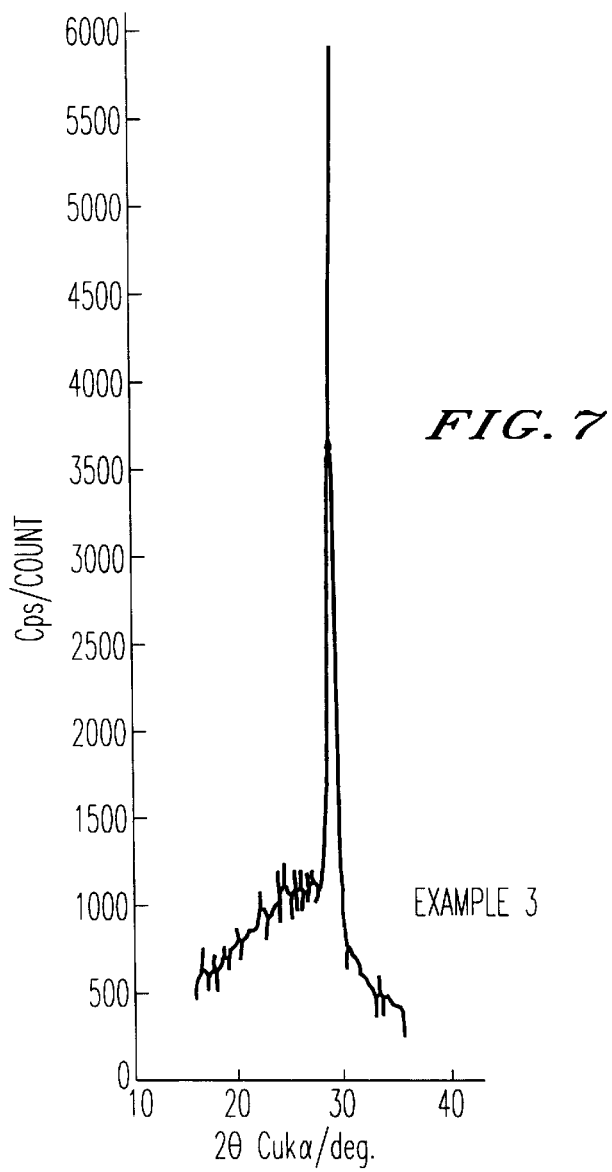
FIG. 7 is an X-ray diffraction pattern of the graphite composite of Example 3, showing the X-ray diffraction peaks thereof.

The graphite composite obtained herein was subjected to X-ray diffractometry using CoKα as the radiation source, and obtained was the resulting X-ray diffraction profile as in FIG. 7. The sharp diffraction peak seen in FIG. 7 at 2 θ of 27.9° resulted from the intercalation compound particles, which verifies that the intercalation compound particles formed had good crystallinity and that any side products such as lithium carbide were not formed. From this diffraction peak, obtained was the layer-to-layer distance in the intercalation compound particles formed.

As a result, the layer-to-layer distance in the intercalation compound particles formed in the graphite composite was 3.71 angstrom. This almost corresponds to the known layer-to-layer distance, 3.72 angstrom, in known intercalation compound particles as formed through intercalation of lithium particles into the layers of graphite particles. From this, it is understood that the graphite intercalation compound particles formed in the graphite composite produced herein had good crystallinity.

COMPARATIVE EXAMPLE 1

A powdery mixture was prepared, comprising 2.4022 g of a powder of highly-oriented pyrolyzed graphite (HOPG) with a degree of graphitization of 0.92 and 2. 247 g of a silicon powder as obtained by grinding silicon wafers followed by classifying the resulting particles through a 300-mesh sieve. This had a graphite content of 20 atomic %. This was ground under the same condition as in Example 1, except that the grinding time was 1 hour, to obtain a graphite composite comprising graphite particles and fine silicon crystallites.

Figure 8:
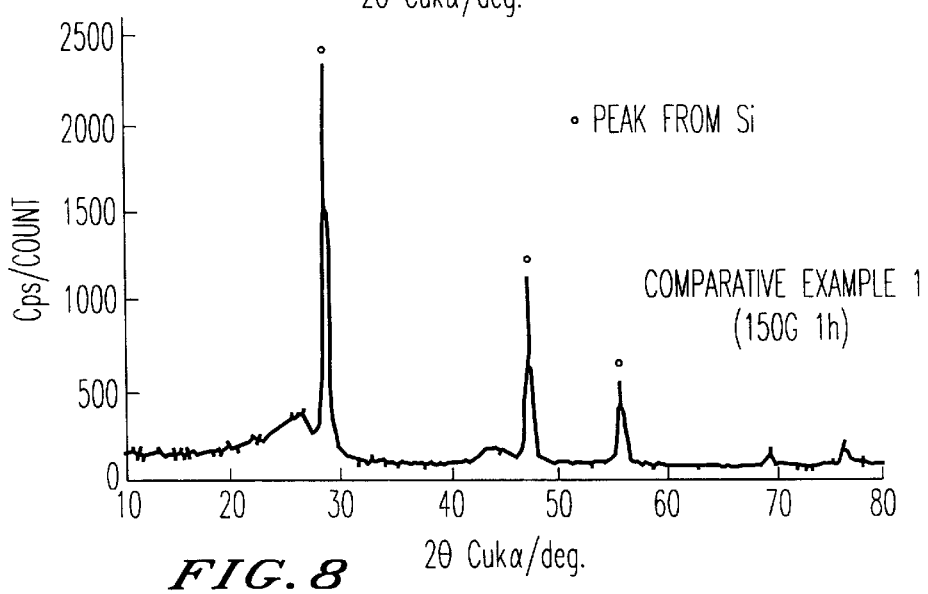
FIG. 8 is an X-ray diffraction pattern of the graphite composite of Comparative Example 1, showing the X-ray diffraction peaks thereof.

The graphite composite obtained herein was subjected to X-ray diffractometry in the same manner as in Example 1, and obtained was the resulting X-ray diffraction profile as in FIG. 8. Like in Example 1, the profile in FIG. 8 gave diffraction peaks resulting from the fine silicon crystallites existing in the graphite composite. From these diffraction peaks, obtained was the particle size of the fine silicon crystallites existing in the graphite composite, according to the above-mentioned Scherrer's equation.

As a result, the particle size of the fine silicon crystallites existing in the graphite composite was 105 nm.

This indicates that fine silicon particles having particle sizes of not larger than 900 nm were formed in the graphite composite obtained herein.

COMPARATIVE EXAMPLE 2

A powdery mixture was prepared, comprising 2.4022 g of a powder of natural graphite (produced in Santo-sho, China) with a degree of graphitization of 0.93 and 5.5528 g of a powder of lithium metal. This had a graphite content of 20 atomic %. This was ground under the same condition as in Example 1, except that the grinding acceleration was 10 G and that the grinding time was 12 hours, to obtain a graphite composite comprising graphite particles and fine lithium particles.

The graphite composite obtained herein was subjected to X-ray diffractometry in the same manner as in Example 1. Though not shown herein, the resulting X-ray diffraction profile gave no sharp diffraction peak, being different from that in FIG. 7 that gave a sharp diffraction peak at 2 θ of 27.9°. This verifies that the graphite composite obtained herein did not have any intercalation compound particles with good crystallinity.

COMPARATIVE EXAMPLE 3

Two-bulb Method 4.504 g of natural graphite (produced in Santo-sho, China) having a degree of graphitization of 0.93 was put into one of two bulbs of a Pyrex glass tube, while 0.868 g of a powder of lithium metal was put into the other bulb. The proportion of the graphite to the combination of the graphite and the lithium powder was 75 atomic %. The tube was degassed to a vacuum at $10^{-5}$ Torr, and then sealed. The graphite and the lithium powder in the bulbs were heated at 300° C. and at 270° C., respectively, with a heater provided outside the tube. The lithium vapor formed through the heating of the lithium powder was intercalated into the layers of graphite particles to give intercalation compound particles. Thus was obtained herein a graphite composite comprising graphite particles, lithium precipitates and said intercalation compound particles.

The graphite composite thus obtained herein was subjected to X-ray diffractometry in the same manner as in Example 3. Though not shown herein, the resulting X-ray diffraction profile gave a sharp diffraction peak, like in FIG. 7 that gave a sharp diffraction peak at 2 θ of 27.9°. This verifies that the graphite composite obtained herein had some intercalation compound particles with good crystallinity.

Construction of Lithium Secondary Batteries, and Measurement of Discharging Capacity of the Batteries"

Now, the graphite composites prepared above were separately kneaded with 4% by weight of Teflon (PTFE). The resulting mixtures were then separately applied onto nickel disc collectors (diameter: 15 mm, thickness: 50 μm) through compression molding to obtain sample electrodes each having a green compact of the individual graphite composite on the individual collector. Using any of these sample electrodes as the negative electrode, constructed were button-shaped lithium secondary batteries (diameter: 20mm, thickness: 4mm), in which the counter electrode made of lithium metal had a diameter of 15 mm and a thickness of 1.8 mm, the reference electrode made of lithium metal had a size of 2 mm×0.5 mm×3 mm, and the electrolytic solution was one ml of a solution that had been prepared by dissolving 1 mol/liter of $LiPF_6$ in a solution of ethylene carbonate/diethylene carbonate (1/1, by volume).

The lithium secondary batteries thus constructed herein were subjected to a constant-current charging/discharging test to determine the discharging capacity of each battery. In this test, the current density was kept constant at 19.2 mA/g. In this, the charging/discharging final voltage for discharging was set at 0.05 V, while the charging/discharging final voltage for charging was set at 3.0 V, and each sample battery was subjected to repeated 100 charging/discharging cycles between 0.05 V and 3.0 V.

The original discharging capacity of each lithium secondary battery comprising any of the graphite composites of Examples 1 to 3 and Comparative Examples 1 to 3 is shown in Table 1 below. The discharging capacity of each battery, after having been subjected to repeated 100 charging/discharging cycles as above, was measured. From the data was obtained the percentage of retentiveness (%) of the discharging capacity of each battery, relative to the initial discharging capacity thereof, which indicates the cycle characteristic of each battery. The percentage of retentiveness of the discharging capacity of each lithium secondary battery thus obtained is shown in Table 1.

TABLE 1

|  | Original Discharging Capacity (mAh/g) | Percentage of Retentiveness of Discharging Capacity (%) |
|---|---|---|
| Example 1 | 783 | 87 |
| Example 2 | 705 | 91 |
| Example 3 | 812 | 84 |
| Comparative Example 1 | 358 | 2 |
| Comparative Example 2 | 1025 | 4 |
| Comparative Example 3 | 683 | 2 |

As is obvious from Table 1 above, the lithium secondary batteries each comprising any of the graphite composites of Examples 1 to 3 had a high discharging capacity of 783 mAh/g, 705 mAh/g and 812 mAh/g, respectively. The percentage of retentiveness of the discharging capacity of these batteries, after having been subjected to repeated 100 charging/discharging cycles, was high to fall between 84% and 91%. As opposed to these, the percentage of retentiveness of the discharging capacity of the lithium secondary batteries each comprising any of the graphite composites of Comparative Examples 1 to 3 was low to fall only between 2% and 4%. These data verify that the graphite composites of Examples 1 to 3 are superior to those of Comparative Examples 1 to 3 as the electrode material to be in lithium secondary batteries.

Negative electrodes as prepared by mixing any of the graphite composites of Examples 1 to 3 with any of different negative electrode materials also gave high percentages of retentiveness of the discharging capacity of batteries comprising any of these.

Using any of the fine graphite crystals illustrated below, the same process as in Example 3 was repeated to prepare graphite composites in which a part of fine lithium particles formed an intercalation compound with graphite particles. For the details of this, referred to is Japanese Patent Application No. 8-47407 incorporated herein by reference.

EXAMPLE 4

6.0 g of a powder of highly-oriented pyrolyzed graphite (HOPG) having a degree of graphitization of 0.92 was put into a stainless, 80-cc planet ball mill, and air existing in the mill was substituted with argon gas to make the mill have an inert atmosphere, prior to starting the grinding of the graphite in the mill. Under this condition, the graphite was ground at a grinding acceleration of 100 G, at room temperature for 1 hour, to give fine graphite crystallites of this example.

EXAMPLE 5

The same highly-oriented pyrolyzed graphite was ground under the same condition as in Example 4, except that the grinding acceleration was 50 G and the grinding time was 2 hours, to obtain fine graphite crystallites of this example.

EXAMPLE 6

The same highly-oriented pyrolyzed graphite was ground under the same condition as in Example 4, except that the grinding acceleration was 30 G and the grinding time was 4 hours, to obtain fine graphite crystallites of this example.

EXAMPLE 7

The same highly-oriented pyrolyzed graphite was ground under the same condition as in Example 4, except that the grinding acceleration was 150 G and the grinding time was 1 hour, to obtain fine graphite crystallites of this example.

What is claimed is:

1. A graphite composite comprising:

graphite particles forming at least 40 atomic % of said composite and fine particles dispersed in said graphite particles, wherein said fine particles comprise an element except carbon, said fine particles have particle sizes of 900 nm or smaller, and said graphite particles and said fine particles have been ground and mixed at a grinding acceleration of at least 2 G or larger.

2. The graphite composite as claimed in claim 1, wherein said element is at least one selected from the group consisting of Li, Al, Sn, Pb, Cd, Ag, Au, Ba, Be, Bi, Ca, Cr, Cu, K, Mn, Mo, Nb, Ni, Na, Pd, Ru, Te, Ti, Pt, Pu, Rb, Zr, Zn, Se, Sr, Sb, Si, Tl, V, Ge and S.

3. The graphite composite as claimed in claim 1, wherein said element is not capable of alloying with lithium.

4. The graphite composite as claimed in claim 1, wherein said fine particles are of silicon crystallites or of lithium particles.

5. The graphite composite as claimed in claim 1, wherein at least a part of said fine particles forms an intercalation compound with said graphite particles.

6. The graphite composite as claimed in claim 5, wherein said fine particles are of lithium particles.

7. The graphite composite as claimed in claim 1, wherein said graphite particles have a specific surface area of 100 $m^2/g$ or larger.

8. The graphite composite as claimed in claim 1, wherein the hydrogen content of said graphite particles is 0.05 or smaller in terms of H/C, the atomic ratio of hydrogen to carbon constituting said graphite particles.

9. The graphite composite as claimed in claim 1, wherein said graphite particles are heat-treated in a steam atmosphere at from 600° to 900° C.

10. A negative electrode of a lithium secondary battery, the negative electrode comprising the graphite composite as claimed in claim 1.

11. A negative electrode of a lithium secondary battery, the negative electrode comprising
   a negative electrode material, and
   the graphite composite as claimed in claim 1.

12. The negative electrode as claimed in claim 11, wherein said fine particles are of lithium particles.

13. A method for producing a graphite composite comprising
   preparing a powdery mixture of at least 40 atomic % of graphite particles with a balance of particles of other elements;
   grinding said mixture at a grinding acceleration of at least 2 G or larger; and
   forming the graphite composite as claimed in claim 1.

14. The graphite composite as claimed in claim 1, wherein said graphite particles comprise non-intercalated graphite particles.

15. The graphite composite as claimed in claim 1, wherein said graphite composite consists of said graphite particles and said fine particles.

16. The graphite composite as claimed in claim 15, wherein said graphite particles consist of non-intercalated graphite particles.

* * * * *